US008533600B2

(12) United States Patent
Corbefin

(10) Patent No.: US 8,533,600 B2
(45) Date of Patent: Sep. 10, 2013

(54) DEVICE FOR CONTROLLING THE SWITCHING OF A USER INTERFACE

(75) Inventor: Jean-Philippe Corbefin, Cornebarrieu (FR)

(73) Assignee: Airbus Operations SAS, Toulouse (FR)

( * ) Notice: Subject to any disclaimer, the term of this patent is extended or adjusted under 35 U.S.C. 154(b) by 1720 days.

(21) Appl. No.: 11/866,027

(22) Filed: Oct. 2, 2007

(65) Prior Publication Data

US 2008/0098307 A1 Apr. 24, 2008

(30) Foreign Application Priority Data

Oct. 20, 2006 (FR) ...................................... 06 54406

(51) Int. Cl.
*G06F 3/00* (2006.01)
(52) U.S. Cl.
USPC .......................................... 715/733; 715/734
(58) Field of Classification Search
USPC .......................................... 715/733, 737, 734
See application file for complete search history.

(56) References Cited

U.S. PATENT DOCUMENTS

| 6,557,170 | B1 * | 4/2003 | Wilder et al. | 725/130 |
|---|---|---|---|---|
| 7,737,964 | B2 * | 6/2010 | Liu | 345/213 |
| 7,802,190 | B2 * | 9/2010 | Uchida et al. | 715/737 |
| 2004/0162891 | A1 * | 8/2004 | Volnak | 709/218 |
| 2004/0263475 | A1 * | 12/2004 | Wecker et al. | 345/157 |
| 2005/0132403 | A1 * | 6/2005 | Lee et al. | 725/38 |
| 2005/0275641 | A1 * | 12/2005 | Franz | 345/204 |
| 2006/0202964 | A1 * | 9/2006 | Liaw et al. | 345/168 |
| 2007/0038939 | A1 * | 2/2007 | Challen et al. | 715/734 |
| 2007/0070042 | A1 * | 3/2007 | Lin et al. | 345/168 |

* cited by examiner

*Primary Examiner* — Omar Abdul-Ali
(74) *Attorney, Agent, or Firm* — Oblon, Spivak, McClelland, Maier & Neustadt, L.L.P.

(57) ABSTRACT

This invention relates to a device for controlling the switching of a user interface (100) to a plurality of computers (120, 130, 150), said user interface including display means (111) and at least one input peripheral (112), and being interconnected with said plurality of computers via a switch (165). The device includes a memory (225) for storing a list of identifiers, each identifier identifying an application available on one of said computers; a graphical interface (220) for generating a window including a menu, said menu containing the list of applications the identifiers of which are stored in said memory; control means (250) adapted to receiving a selection command identifying an application selected from said list by at least said input peripheral and to transmitting to said switch an order for switching said interface to the corresponding inputs/outputs of the computer hosting said selected application.

11 Claims, 6 Drawing Sheets

DEVICE FOR CONTROLLING THE SWITCHING OF A USER INTERFACE

TECHNICAL FIELD

This invention relates in general to the ergonomics of user interfaces, and more specifically to the field of so-called KVM (Keyboard Video Mouse) switches.

PRIOR ART

In some cases, the increasing complexity of computer systems results in the use of several computers collectively. For cost and space requirement reasons, use is then often made of a switching device referred to as a KVM switch, for sharing the user interface, in particular the keyboard, display screen and mouse, between the various machines. A switch such as this makes it possible to manually or electronically select the computer with which one wishes to work, through a combination of keystrokes or a mouse click within a menu. The inputs/outputs of the selected computer are then connected to the user interface.

When several applications are hosted by different machines, the switching operation can prove to be relatively complex. As a matter of fact, without prior knowledge of the distribution of the applications, the user is thereby quite often compelled to successively switch to the various machines in order to identify the one which hosts the desired application. Furthermore, if the user wishes to interact with an application already launched, while it is running in the background, the latter may very well go unnoticed. They must then restart the switching operation, which is a source of wasted time. On the other hand, if identical or similar applications are being launched or closed out on various machines, there is a high probability of confusion and ill-timed activation.

The above-mentioned situation can prove to be critical in certain types of environments, such as an industrial process control post, a traffic control post or else an aircraft cockpit, any operator error or delay being likely to have severe consequences.

Some airplane cockpits are now equipped with an OIT (on-board information terminal) enabling the pilot to consult the aircraft operating manual, safety instructions, information relating to the flight, etc., on-line.

The user interface of the OIT system is connected to one or more computers belonging to a secured area of the airplane, with access reserved to the pilots. The secured area (also called an avionics area) includes the information and control systems of the airplane located in the cockpit and avionics bay.

Provisions are made for the user interface of the OIT system to also be capable of being connected to computers belonging to an unsecured area, also referred to as an open area. This area is accessible to the pilots as well as to the maintenance personnel. The applications hosted by the computers belonging to this area are, in particular, airplane, maintenance and mapping documentation applications.

The majority of the computers in the secured area and unsecured area are connected to a network. This network has the special feature of being partitioned into two sub-networks corresponding to the secured area and to the unsecured area, respectively, the intra-area links having the capability of being of the two-way simultaneous type, and the inter-area links necessarily being of the simplex type, directed from the secured area towards the unsecured area.

FIG. 1 shows an OIT system equipped with a KVM switch, as known in the prior art. The OIT system consists of a user interface 110, a first computer 120 belonging to the secured area and a second computer 130 belonging to the unsecured area. The computers 110 and 130 are interconnected by means of a unidirectional link 125, shown symbolically by a diode. The computer 120 is also interconnected with the sub-network of the secured area via a two-way simultaneous link 115. In the same way, the central processing unit 130 is interconnected with the sub-network of the unsecured area via a two-way simultaneous link 135.

The computers 120 and 130 are interconnected with the user interface 110 by way of a KVM switch 160, of the manual type here. The links 170 between the computers and the KVM switch as well as between the latter and the user interface are ensured by VGA or DVI cables, as concerns the display screen, and by PS/2 or USB cables, as concerns the keyboard and the mouse.

To illustrate, and in particular for servicing needs, a notebook computer 140 and subnotebook computer 150 (of the Tablet PC™ type), which are capable of being connected to the KVM switch, have also been shown in the figure.

Owing to the KVM switch, the user can select one of the machines 120, 130, 140, 150 with which they wish to interact and, of course, in the case of a plurality of computers, 120 or 130, one from amongst the latter. As seen above, this configuration can be a source of delays and errors in a multi-application context.

One purpose of this invention is to propose a KVM switching device which does not have the aforesaid disadvantages.

DISCLOSURE OF THE INVENTION

This invention is defined by a device for controlling the switching of a user interface to a plurality of computers, said user interface including display means and at least one input peripheral, and being interconnected with said plurality of computers via a switch, the device including:

a memory for storing a list of identifiers, each identifier identifying a application available on one of said computers;

a graphical interface for generating a window including a menu, said menu containing the list of applications the identifiers of which are stored in said memory;

control means adapted to receiving a selection command identifying an application selected from said list by at least said input peripheral and for transmitting to said switch an order to switching said interface to the corresponding inputs/outputs of the computer hosting said selected application.

The graphical interface is adapted to generating said menu on said display means via a pop-up or a picture-in-picture.

The device advantageously includes detection means adapted to receiving the data transmitted by at least said input peripheral, to detecting therein a command for the control means and, in the absence of detection, to transmitting said data to said switch.

The graphical interface is adapted to generating said menu upon receiving a predetermined command from the user, and to deleting it after a predetermined lapse of time, if no selection command is received by the detection means.

According to one embodiment, said control means are adapted to transmitting and receiving messages over a first bus, intended to be connected to said switch, said messages including orders for switching the inputs/outputs of said computers to said interface, and corresponding switching acknowledgements.

Furthermore, said control means can be adapted for transmitting and receiving messages over a second, CAN-type bus, intended to be interconnected with at least one computer of said plurality, said messages including orders for start-up, foreground display, closing an application available on this computer, as well as corresponding acknowledgements of successful execution.

The graphical interface is advantageously adapted to modify the appearance of a selection button in said menu, corresponding to the application selected by the user, upon receipt of said acknowledgement of switching or successful execution by the control means.

According to one alternative, said menu further includes a list of computers the inputs/outputs of which can be switched over to the user interface by means of a manual switch, and wherein the control means are adapted to receiving switching information from said manual switch.

In this case, the graphical interface is adapted to modify the appearance of a selection button in said menu, corresponding to the computer selected by said manual switch, upon receipt of said switching information by the control means.

The invention is also defined by a switching device including a video signal, keyboard and mouse switch for a plurality of computers on a user interface including display means, and a keyboard and a mouse as input peripherals, as well as a device for controlling switching as described above.

The invention is additionally defined by an aircraft computer system, said system being partitioned into a secured area and an unsecured area and including a plurality of computers connected to a network, each link between a computer of the secured area and a computer of the unsecured area being of the simplex type, directed from the secured area to the unsecured area, said system further including a user interface, an automatic KVM switch and a switching control device as described above, said switch being connected, on the one hand, to the respective inputs/outputs of said computers and, on the other hand, to said device, the latter being connected to said user interface and adapted to controlling said switch for switching said interface to said plurality of computers.

At least one sub-set of said plurality of computers is advantageously connected by a CAN bus, said bus also interconnecting said device and said switch, each computer of this sub-set belonging to the secured area being connected to the CAN bus by a transmit buffer and a receive buffer, each computer of this sub-set belonging to the unsecured area being connected to the CAN bus by a receive bus only.

Finally, the invention is defined by an aircraft including a computer system as presented above.

BRIEF DESCRIPTION OF THE DRAWINGS

Other characteristics and advantages of the invention will become apparent upon reading about a preferred embodiment of the invention made in reference to the attached figures, among which.

DETAILED PRESENTATION OF PARTICULAR EMBODIMENTS

The idea upon which the invention is based is to provide for the display, in the display screen, of the list of applications available on the various computers to which the KVM switch is connected, and to carry out automatic switching of the interface onto the computer hosting the application selected by the user.

Figure 1:
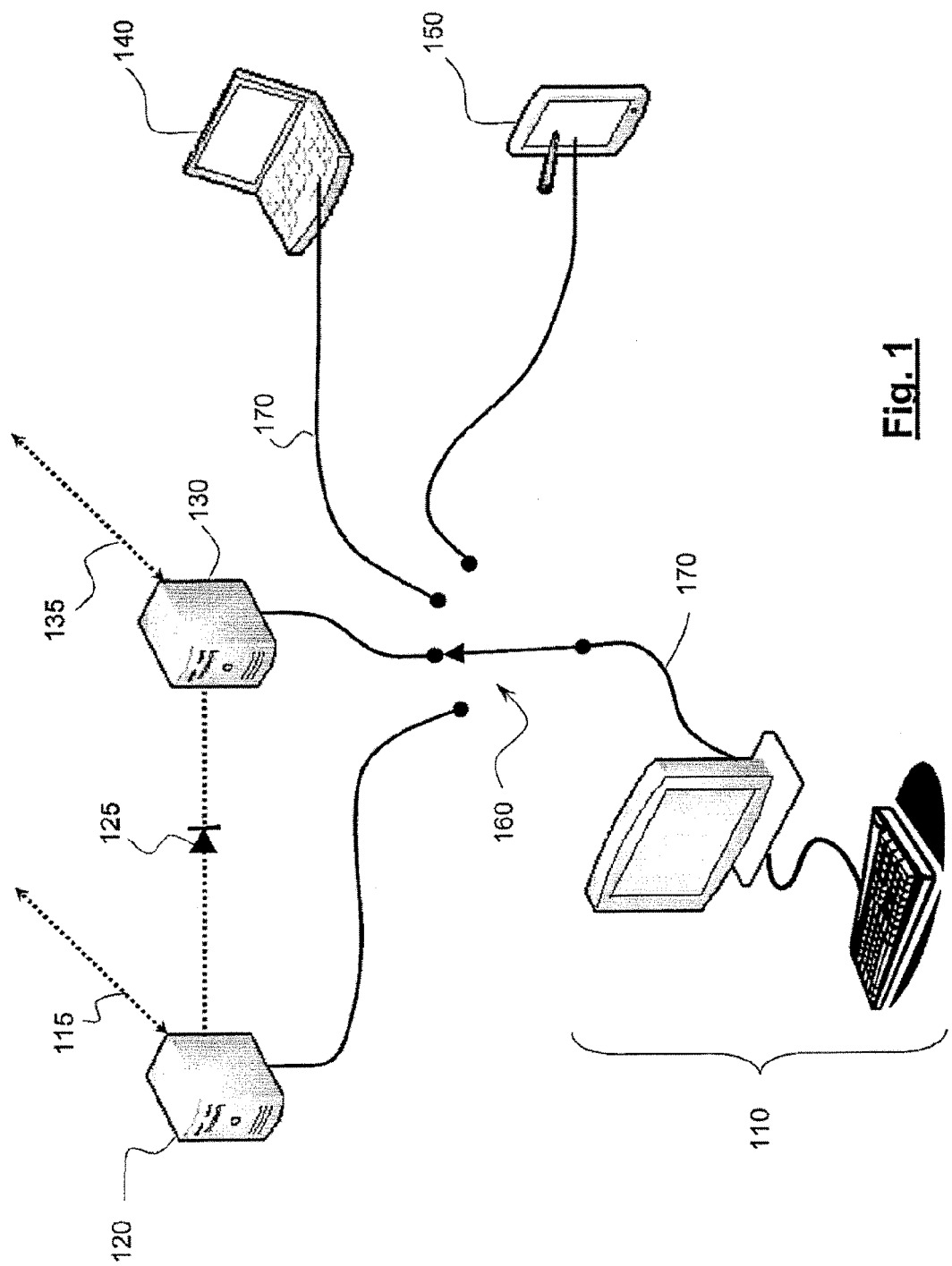
FIG. 1 schematically illustrates a KVM switching device associated with an OIT system, as known from the prior art.
Figure 2:
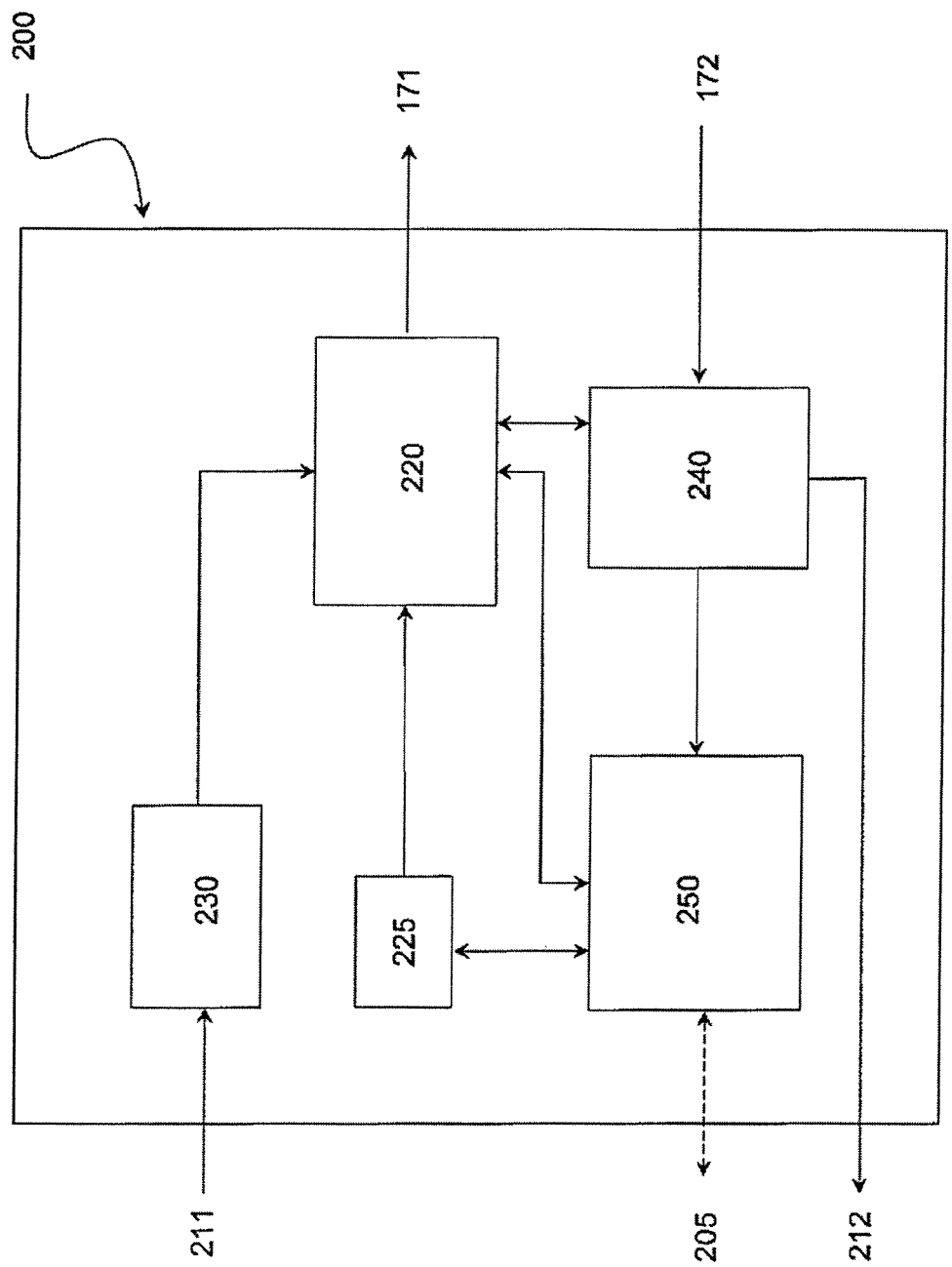
FIG. 2 is a schematic representation of the structure of a device for controlling the switching of a user interface according to the invention.

To this effect, a device is used for controlling the switching of the user interface, as illustrated schematically in FIG. 2.

This control device 200 can be integrated into the KVM switch package or else be made in the form of a separate package. In both cases, the control device 200 can be connected to the inputs/outputs of the selected computer via the KVM switch. These inputs/outputs include a video link 211 (e.g. a VGA-format or DVI-format link) and a keyboard/mouse link 212 (transmitted, for example, via PS/2 or USB links). For reasons of simplification, the keyboard and mouse links have been shown as one and the same link. As a practical matter, of course, these links are separate.

The device 200 supplies a video signal 171 (in VGA format or in DVI format) intended for the display means of the user interface, and, at 172, receives the signals from one or more input peripheral(s) of this interface. For simplification's sake, it will be assumed, but without loss of generality, that the input peripherals belonging to the user interface consist of a keyboard and a mouse. Those skilled in the art, however, will understand that other types of input peripherals might also be anticipated, such as a touch-sensitive surface, light pen, etc.

The device 200 includes a memory 225 in which a list of identifiers is stored, each identifier identifying an application hosted by one of the computers connected to the KVM switch. A computer is generally understood to mean a real or virtual machine using one or more microprocessors capable of interacting with a user via the aforesaid interface.

The device 200 further includes control means 250, a graphical interface 220, detection means 240 and, optionally, video capture means 230.

According to a first alternative embodiment, the capture means 230 are absent and the graphical interface 220 then receives the video signal directly from the link 211. The graphical interface is adapted for generating a window continuously, or even temporarily, when enabled by the user, a window intended to be displayed by the display means, said window presenting the list of applications hosted by the various computers in the form of a menu. The applications appearing in the menu will advantageously no longer appear in the taskbars of each computer.

The menu format can take on various forms. First of all, it can be a continuous pop-up (picture-on-picture) in a dedicated area of the display screen. It can be of the "pop-up" type, the menu appearing, for example, by means of a right click on the mouse, or else by a particular combination of keystrokes, or else by pressing a dedicated physical key of the interface. The video signal of the menu window is then either embedded in the video signal of 211, or "overlaid" by summation with the latter. The menu can advantageously disappear from the display screen at the end of a certain display time, if the user does not make a selection from it.

According to a second alternative embodiment, the capture means 230 receive the video signal from the video link 211 and store the captured image in the form of a pixel matrix. When enabled by the user, the graphical interface 220 is adapted to generate a window intended to be displayed by the display means, said window containing the captured video image and presenting the list of applications hosted by the various computers in the form of a menu. The menu format can assume the form of a taskbar appearing, for example, at the top or bottom of the window. It shall be understood that this taskbar is "shared", in the sense that it groups together all of the applications available on the various computers. The applications appearing in the shared taskbar will then advantageously no longer appear in the individual taskbars of each computer.

Whatever alternative is chosen, the list of applications hosted is stored in the memory 225 and can be read by the graphical interface 220. Each application of said list is referenced by an identifier. For each identifier, the port number of the KVM switch to which the computer hosting the application is connected is also stored in memory.

As seen, generation of the menu can be continuous (video encrustation), or else triggered by a user action. The user action can be a combination of keystrokes and/or a mouse click. The request to open the menu is detected by detection means 240 prior to being transmitted to the control means 250. The latter then issue an order to the graphical interface 220 to generate the menu.

Generally, the function of the detection means 240 is to detect keystroke and/or mouse click combinations corresponding to a device command 200. If such a command is detected, it is transmitted to the control means 250. In the absence thereof, it is simply ignored by the device 200 and forwarded over the keyboard/mouse link 212.

Whatever mode of format is adopted for the menu, the user can select the application from it with which they wish to interact, e.g. in order to launch it, close it or else modify the course of its execution. The device 200 receives the selection command over the keyboard/mouse link 172, even though, as was stated, other input peripherals can also be anticipated. This selection command can be a combination of keystrokes and/or a mouse click. It is detected by the detection means 240, if applicable, in cooperation with the graphical interface 220, in order to determine if the mouse cursor is situated within the menu area. The selection information is transmitted to the control means 250, which can consult the graphical interface 220 in order to obtain the identifier of the selected application, if it is not clearly provided by the selection information. The control means 250 search the memory 225 for the KVM port associated with the computer hosting the selected application, and transmit an order over the bus 205 for switching the inputs/outputs connected to this port. The bus 205 connects the switching control device to the KVM switch. If the control device 200 and the KVM switch are integrated into the same package, the bus 205 is, of course, an internal bus. On the other hand, if they are made in the form of separate packages, the bus 205 will advantageously be of the CAN type.

After the switching operation has been carried out, the KVM switch returns acknowledgement information to the device 200 via the bus 205. The control means 250 notify the graphical interface 220 of this. The latter can then indicate whether the desired application can be accessed, via a change in appearance of the application button in the menu/taskbar.

According to a first exemplary embodiment, the device 200 is directly connected to the switched computers, or to some of them only, by means of a serial bus, and advantageously a CAN bus. As shown, this bus will advantageously be identical to the one serving the KVM switch. Owing to this link, the device 200 can request the computer hosting the selected application to launch it, if it has not already started, or else to bring it to the foreground, if it is active in the background. Thus, from the moment the video signal is switched, the working page of the application is already present on the screen.

The CAN link also makes it possible to close an application directly from the shared menu without necessarily switching the video display. The action of closing the application is detected by the detection means 240, possibly in cooperation with the graphical interface 220. The close command is transmitted to the control means 250, which in turn send a request to close the application to the computer concerned, via the CAN bus 205.

Finally, the CAN link can be used by the device 200 to establish the list of applications available on the various computers of the secured area. In order to do so, a specific request is transmitted by the control means 250, when it is powered up or when a new computer is connected. Each computer of the secured area, connected to the CAN bus, responds by providing its identity and the list of applications that can be called up via the user interface. For security reasons, the various computers of the unsecured area are not authorised to transmit over the CAN bus. Consequently, the list of applications available on these computers is pre-loaded into the memory 225.

Whatever action is requested, the computer which hosts the application can transmit an acknowledgement of successful execution to the device 200 over the bus 205. However, that will only be possible for a computer belonging to the secured area. For example, the computer in question will transmit an acknowledgement that the application has indeed been opened or else that it is displayed in the foreground. When such an acknowledgement is transmitted, the graphical interface 220 waits to be informed of it by the control means 250, in order to modify the appearance of the application button concerned in the shared menu/taskbar.

Thus, for the user, everything takes place as if their interface were connected to a single computer, management of the call-up and closing of the applications being ensured transparently by the switching control device 200.

According to a second exemplary embodiment, the computers are not connected to a CAN bus. In this case, in order to launch or switch over to an application, the control means transmit two consecutive switching orders to the KVM switch: the first one in order to switch the keyboard/mouse link, the second one in order to switch the video link. After a security period has elapsed, following the transmittal of the first switching order, the control means transmit a command in the form of a combination of shortcut keys, as applicable, in order to launch or reveal the selected application in the foreground. In a similar way, in order to close an application from the common menu/shared taskbar, the control means 250 transmit a first order for switching the keyboard/mouse link to the computer hosting the application concerned, then, after a security period has elapsed, a combination of shortcut keys corresponding to the close request, and finally, a second order for switching the keyboard/mouse link, in order to bring the switch back to its initial position, i.e. prior to the first switching operation.

According to one particular embodiment of the invention, the device 200 is adapted to manage a manual KVM switch in addition to an automatic switch. More precisely, the manual switch is daisy-chained with the automatic switch. The manual switch is connected to the device 200 via a dedicated bus or, preferably, via the CAN bus 205, when the latter is present. Once manual switching is carried out, the device 200 is informed of it via this bus. It also receives the number of the selected port from the manual switch. This can be the port to which the automatic switch is connected, or else the port of one of the manually switched computers. The manual switch makes it possible, for example, to take control of subnotebook computer by remoting its inputs/outputs (display, keyboard, mouse).

The applications hosted by the manually switched computers do not appear in the common menu/shared taskbar. According a first mode of operation, when a switch is made to one of the manually switched computers, the control means 250 order the graphical interface 220 to terminate the menu-generating processing, so that the video signal appearing at 171 is none other than the one generated by the manually switched computer. In other words, the common menu/shared taskbar disappears and only reappears when one switches over again to the port of the automatic switch. According to a second mode of operation, the graphical interface does not hide the common menu/taskbar. In this mode, the taskbar is semi-shared, i.e. as will be seen later in an example, it includes not only the list of applications available on the automatically switched computers, but also the list of manually switched computers. When a switch is made to one of the manually switched computers, the control means do not then terminate the windowing and menu-generating processing by the graphical interface 220, but order the latter to indicate the switched computer, e.g., by means of changing the appearance of the corresponding button in the semi-shared taskbar. In this way, the user knows that their interface is connected to the computer indicated in the menu. However, using the interface, they must next manually select the desired application and associated operation: start-up and/or bringing to the foreground, modification or closing.

Figure 3:
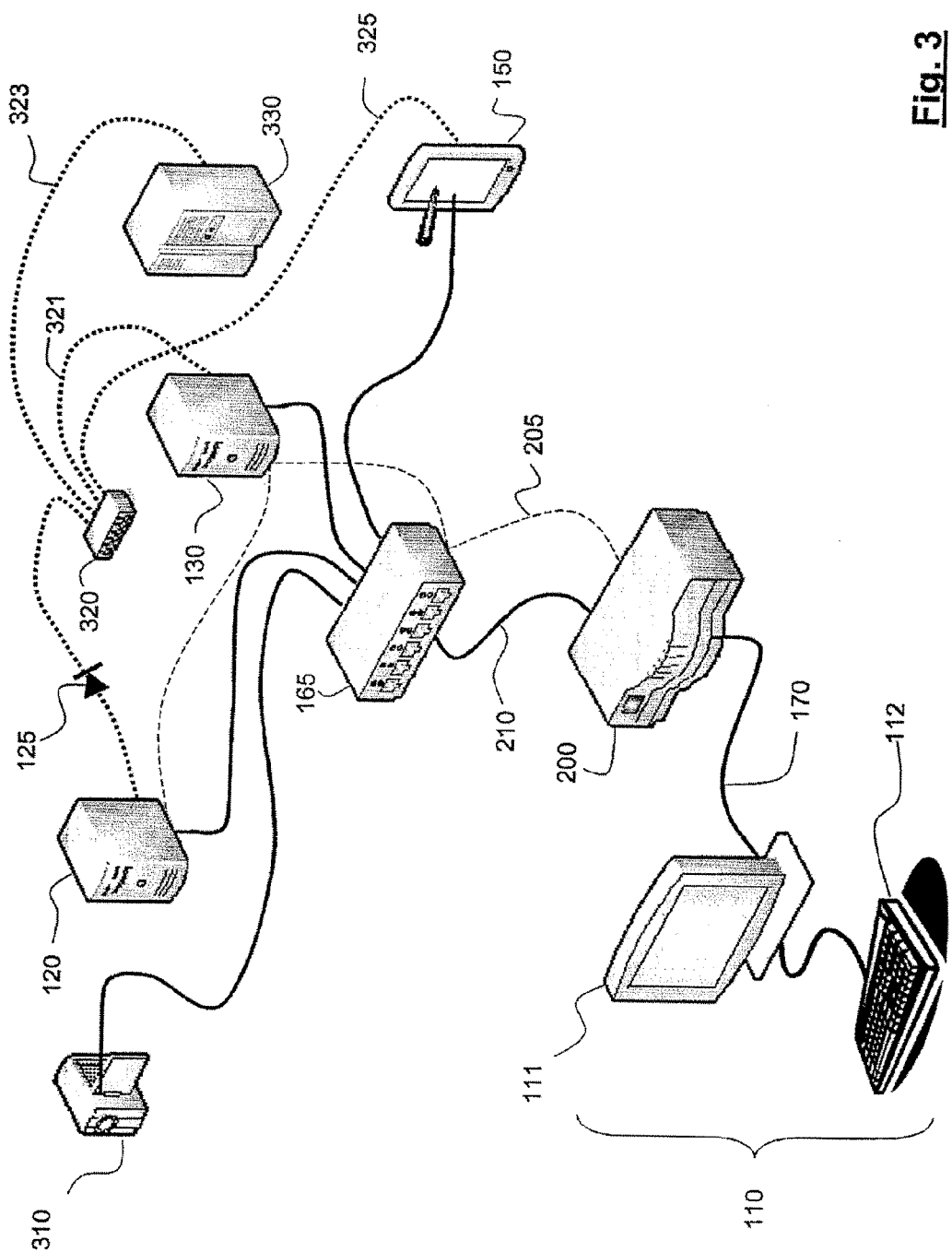
FIG. 3 schematically illustrates a first exemplary use of the device of FIG. 2.

FIG. 3 shows a first exemplary use of the device of FIG. 2, for a computer system onboard an aircraft. In this example, it was assumed that the switching control device 200 and the automatic KVM switch 165 were made in the form of separate packages. The user interface 110 includes display means 111 and at least one input peripheral 112. If applicable, the user can activate the menu of available applications, select an application and interact with it as explained above. The user interface is connected to the device 200 by means of a link 170 symbolising both the video link 171 and the keyboard/mouse link 172. The device 200 is also connected to the KVM switch 165 by means of a video link 211 and a keyboard/mouse link 212, designated here collectively by 210. The KVM switch, on the other hand, is connected to the inputs/outputs of the computers 120, 130, to those of the automatic surveillance camera 310 (considered here to be a computer), and to the subnotebook computer 150. The computer 130, the router 320, the server 330 and the subnotebook computer 150 belong here to the unsecured area, while the computer 120 belongs to the secured area. The link between the computer 120 and the router is ensured by a unidirectional Ethernet link (symbolised by the diode 125). On the other hand, the links 321, 323 and 325 are bidirectional Ethernet links. Some of the computers 120 and 130 here are connected to the KVM switch and to the switching control device 200 via a CAN bus (shown in the figure by a thin dashed line). As seen, the CAN bus enables the user to start up, bring an application into the foreground, or close an application transparently. It is important to note that, for a computer belonging to the unsecured area connected to the CAN bus, such as the computer 130, the CAN bus driver (transmit buffer Tx ensuring conversion of the TTL signal into a differential signal) is not connected to said bus. On the other hand, a computer belonging to the secured area and connected to the CAN bus, such as the computer 120, is connected to this bus, both via a transmit buffer (Tx) and a receive buffer (Rx). Thus, a computer belonging to the unsecured area can only receive over this bus and does not run the risk of transmitting messages capable of interfering with the operation of the computer 120, the KVM switch 165 or the switching control device 200. It shall be understood that one advantage of the invention is to enable the interface 110 to take control of and receive information from both the computers of the secured area as well as the unsecured area, while at the same time guaranteeing segregation of the two areas.

Figure 4:
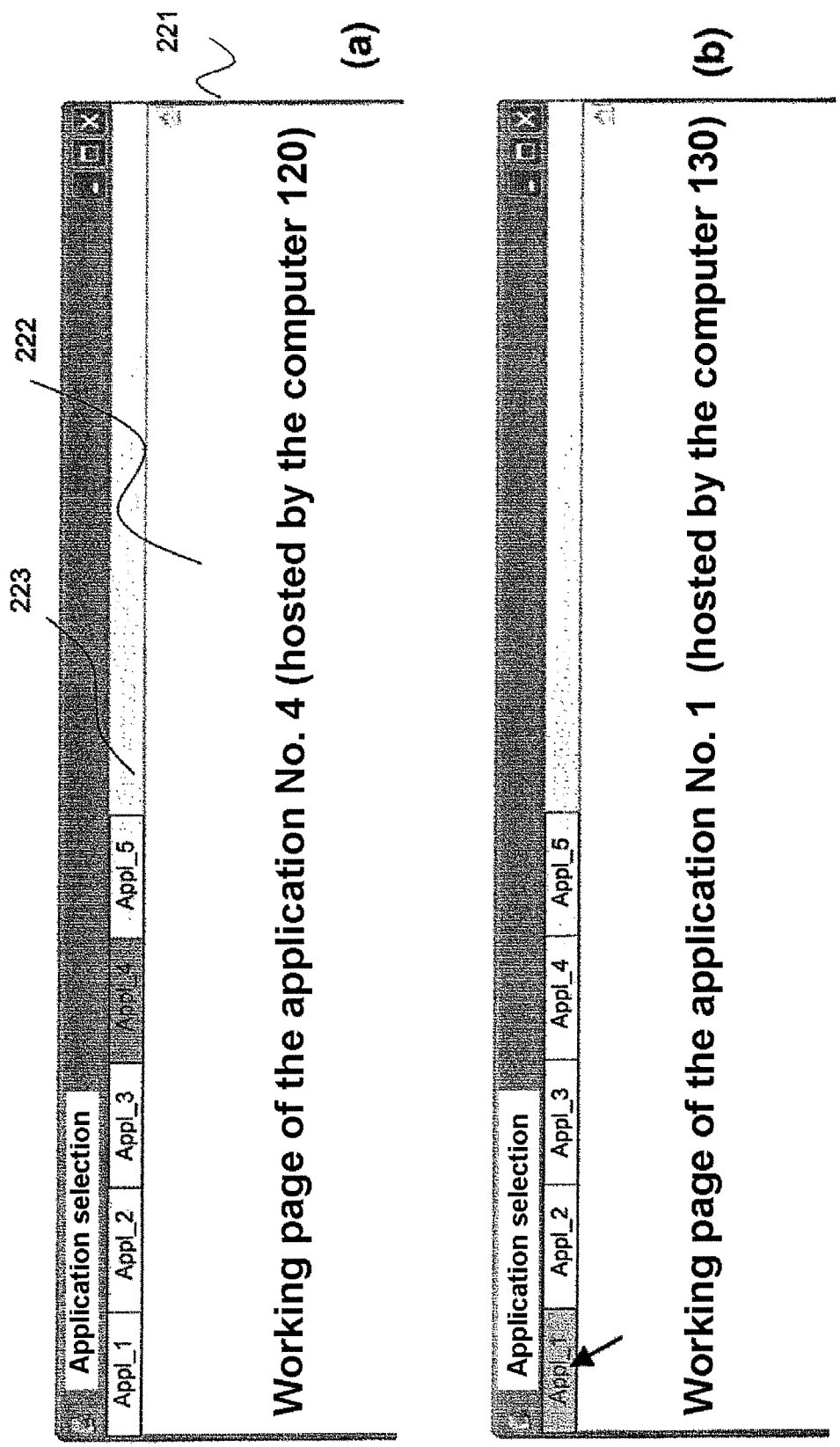
FIG. 4 schematically shows the windows displayed by the display means of FIG. 3, in various switching situations.

FIG. 4 schematically shows the content displayed by the display screen 111, in two successive switching situations (a) and (b). The second aforesaid alternative embodiment has been shown here. The window 221 generated by the graphical interface 220 contains the captured video image 222 and the shared taskbar 223. In the situation (a), it is noted that the task "Appl_4" is enabled and that the captured video image corresponds to the working page of the application 4, hosted by the computer 120. If it is now assumed that the user wishes to interact with the application 1, hosted by the computer 130, they need only click on the corresponding button. The selection command is transmitted to the switching control device 200, which gives the switching order to the KVM switch 165, launches the application 1, if it is not already open, or brings it to the foreground, if it is running in the background. The appearance of the window at the end of the switching operation is provided at (b). It contains the captured video image corresponding to the working page of the application 1. The button for the application 1 is then marked as enabled.

Of course, in the case of the first alternative embodiment, the list of applications appears in the form of a pop-up (or picture-in-picture) menu on the working page of the application being accessed. The remainder of the operation is identical to the one described above.

Figure 5:
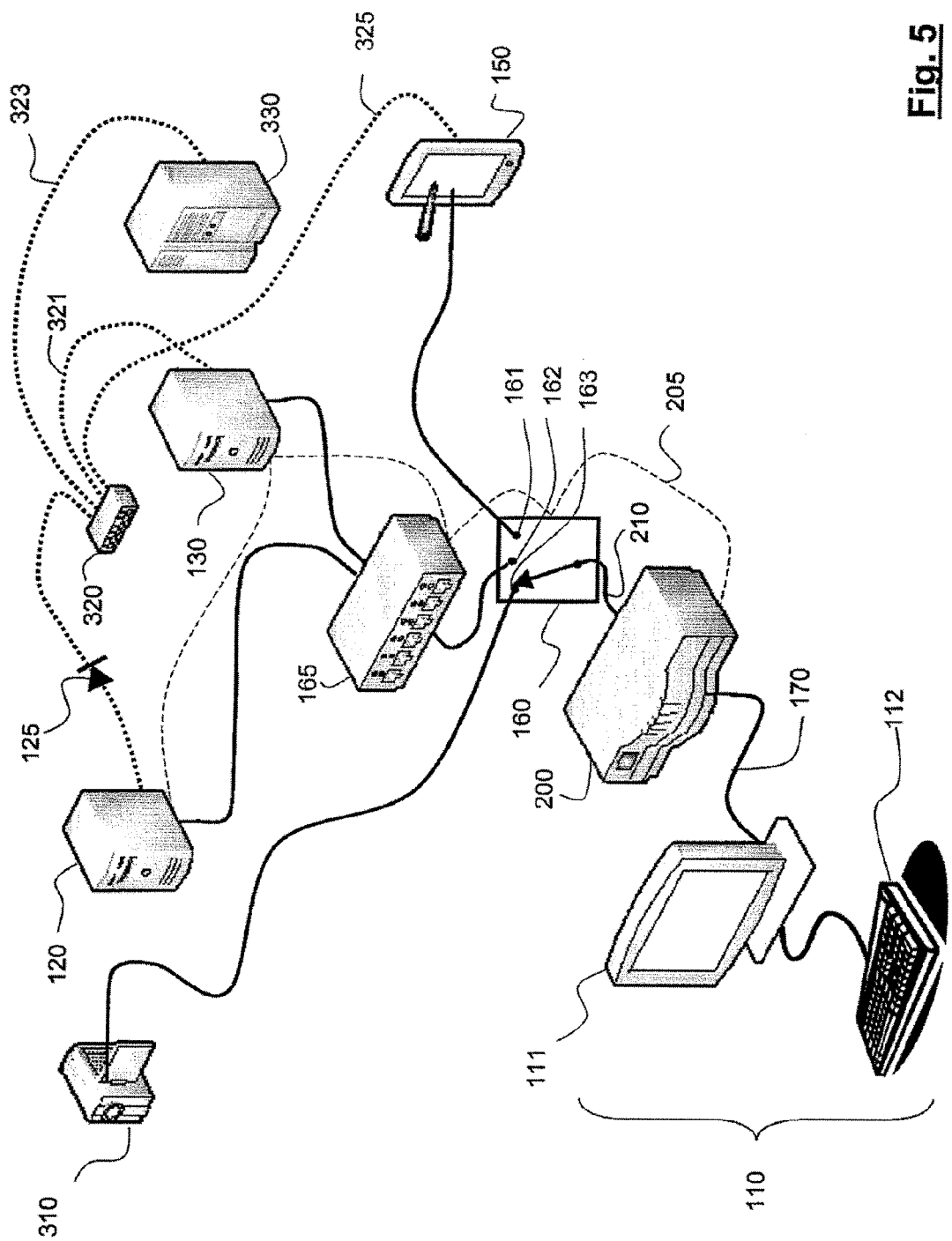
FIG. 5 schematically shows a second exemplary use of the device of FIG. 2.

FIG. 5 schematically illustrates a second exemplary use of the device of FIG. 2, within the framework of the aforesaid particular embodiment.

As opposed to the example shown in FIG. 5, a manual KVM switch 160 is daisy-chained with the automatic KVM switch 165. The presence of the manual switch 160 offers additional connection capabilities in comparison with the preceding example. Where applicable, the manual switch 160 can be built into the switch 165.

The port 162 of the manual switch 160 is connected to the switched port of the switch 165. The other ports 161 and 163 of the manual switch are connected here to the camera 310 and to the subnotebook computer 150, respectively, previously characterised as manually switched computers. The switched port of the manual switch is connected to the control device 200 via the link 210. Finally, the manual switch is connected to the CAN bus 205 and notifies the device 200 of any manual switching.

Figure 6:
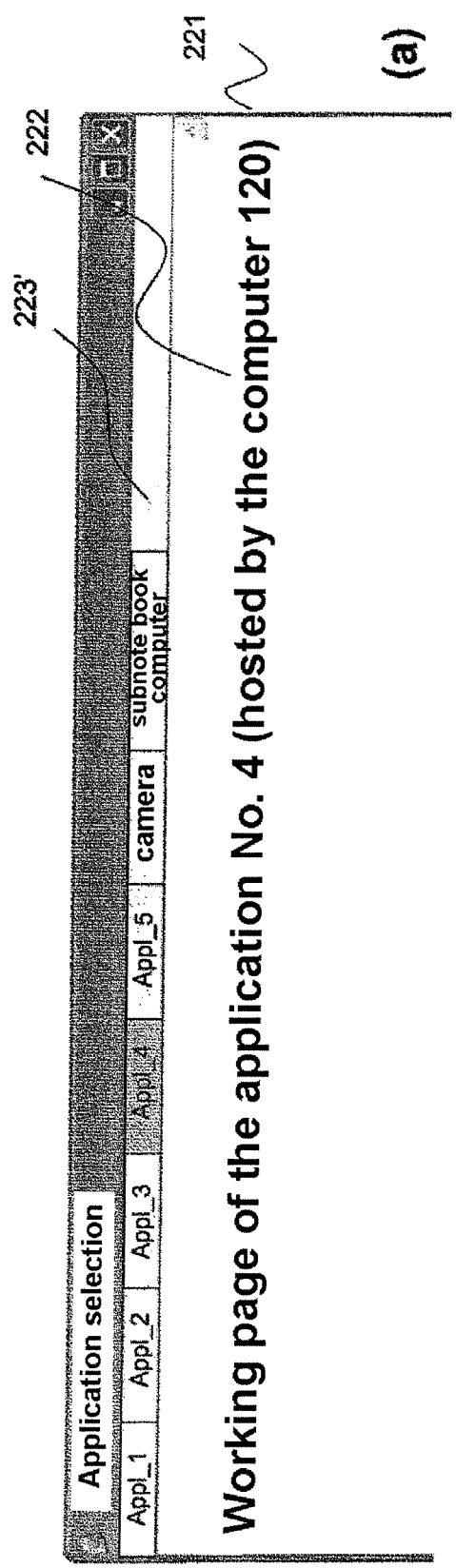
FIG. 6 schematically shows the windows displayed by the display means of FIG. 5, in various switching situations.
Figure 6:
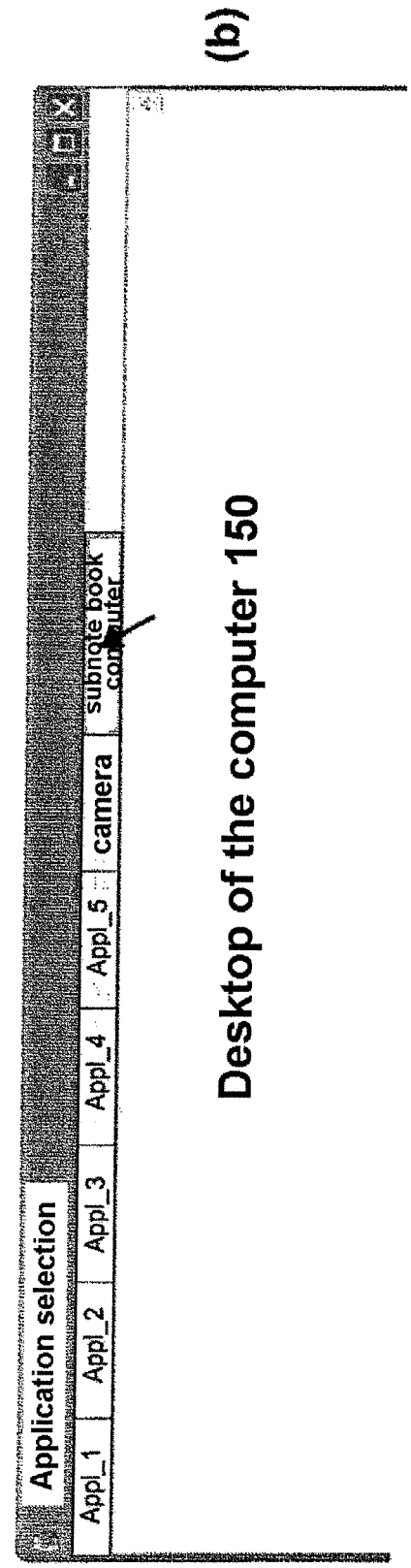

FIG. 6 schematically shows the content displayed by the display screen 111, in two successive switching positions (a) and (b). Here again, the second alternative embodiment has been shown. The window 221 generated by the graphical interface 220 contains the captured video image 222 and the semi-shared taskbar 223'. Besides the list of applications (Appl_1, . . . , Appl_5) available on the automatically switched computers, namely 120 and 130, the taskbar 223 includes the list of manually switched computers, in this case namely the camera 310 and the subnotebook computer 150. The situation (a) corresponds to the selection of the application 4. The captured video image 222 is the one on the working page of the application 4. If it is now assumed that the user wishes to interact with an application hosted on the subnotebook computer, they must click on the button designating this computer. The appearance of the window at the end of the switching operation is provided at (b). It contains the video image corresponding to the desktop of the computer 150. Of course, the key designating the subnotebook computer is marked as enabled. However, the user must next manually select the desired application by means of the input peripheral 112, and, if appropriate, bring it to the foreground, before being able to execute the desired operation.

Just as previously, if the first alternative embodiment is chosen, the pop-up (or picture-in-picture) menu includes the list of applications available on the automatically switched computers as well as the list of manually switched computers. The remainder of the operation is identical to the one described above.

This invention has been described in terms of functional means. It is obvious to those skilled in the art that these means can be of the software type. In particular, the control means, detection means, and the graphical interface can be carried out entirely or partially by computer programmes.

The invention claimed is:

1. A device for controlling the switching of a user interface to a plurality of computers, said user interface including a display and at least one input peripheral, and being configured to interconnect with inputs and outputs, including video inputs and outputs, of one of the computers via a keyboard, video and mouse (KVM) switch, said KVM switch being connected to the inputs and outputs, including video input and outputs, of each of the computers, said device being configured to be connected to the KVM switch, the device comprising:
   a memory to store a list of identifiers, each identifier identifying an application available on one of said plurality of computers;
   a graphical interface to supply a video signal to the display to generate a window to be displayed on the display and including a menu, said menu containing the list of applications the identifiers of which are stored in said memory;
   a controller to receive a selection command identifying an application selected from said menu by at least said input peripheral and to transmit to said KVM switch an order for switching said interface to corresponding inputs/outputs of a computer hosting said selected application,
   wherein the controller is configured to transmit and receive messages over a first bus, configured to be connected to said KVM switch, said messages including orders for switching the inputs/outputs of said computers to said interface, and corresponding switching acknowledgements, and
   the controller is configured to transmit and receive messages over a second CAN-type bus to be interconnected with at least one computer of said plurality of computer, said messages including orders for start-up, foreground display, closing an application available on the at least one computer, and corresponding acknowledgements of successful execution.

2. The device according to claim 1, wherein the graphical interface is configured to generate said menu on said display via a pop-up or picture-in-picture.

3. The device according to claim 1, further comprising a detector to receive the data transmitted by at least said input peripheral, and to detect therein a command for the controller and, in the absence of detection, to transmit said data to said KVM switch.

4. A device according to claim 3, wherein the graphical interface is configured to generate said menu upon receiving a predetermined command from the user, and to delete the menu after a predetermined lapse of time, if no selection command is received by the detector.

5. The device according to claim 1, wherein the graphical interface is configured to modify an appearance of a selection button in said menu, corresponding to the application selected by the user, upon receipt of said acknowledgement of switching or successful execution by the controller.

6. The device according to claim 1, wherein said menu further includes a list of computers the inputs/outputs of which can be switched over to the user interface by a manual switch, and wherein the controller is configured to receive switching information from said manual switch.

7. The device according to claim 6, wherein the graphical interface is configured to modify the appearance of a selection button in said menu, corresponding to the computer selected by said manual switch, upon receipt of said switching information by the controller.

8. A switching device including a video signal, keyboard and mouse switch for a plurality of computers on a user interface including display means, and a keyboard and a mouse as input peripherals, wherein the switching device includes a device for controlling switching as claimed in claim 1.

9. An aircraft computer system, said system being partitioned into a secured area and an unsecured area and including a plurality of computers connected to a network, each link between a computer of the secured area and a computer of the unsecured area being of a simplex type, directed from the secured area to the unsecured area, said system comprising:
   a user interface;
   an automatic keyboard, video and mouse (KVM) switch; and
   a switching control device including:
      a memory to store a list of identifiers, each identifier identifying an application available on one of said plurality of computers;
      a graphical interface to supply a video signal to the display means to generate a window to be displayed on the display and including a menu, said menu containing the list of applications the identifiers of which are stored in said memory;
      a controller to receive a selection command identifying an application selected from said menu by at least said input peripheral and to transmit to said KVM switch an order for switching said interface to corresponding inputs/outputs of a computer hosting said selected application,
   wherein said KVM switch is connected to respective inputs/outputs of said computers, including video inputs and outputs, and with said switching control device, the switching control device being connected to said user interface and being configured to control said KVM switch to switch said interface to said plurality of computers.

10. The computer system of claim 9, wherein at least one sub-set of said plurality of computers is connected by a CAN bus, said bus also interconnecting said switching control device and said KVM switch, each computer of this sub-set belonging to the secured area being connected to the CAN bus by a transmit buffer and a receive buffer, each computer of the sub-set belonging to the unsecured area being connected to the CAN buffer by a receive buffer only.

11. An aircraft comprising a computer system as claimed in claim 9.

* * * * *